(12) United States Patent
Ricart-Ugaz et al.

(10) Patent No.: US 9,206,759 B2
(45) Date of Patent: Dec. 8, 2015

(54) VVA CONTROL OF NOX IN A LOW ΔP AREA OF AN ENGINE OPERATING MAP

(75) Inventors: Laura M. Ricart-Ugaz, Chicago, IL (US); Qianfan Xin, Lake Zurich, IL (US); Daniel Cornelius, Chicago, IL (US); Luis Carlos Cattani, Aurora, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 130 days.

(21) Appl. No.: 14/240,439

(22) PCT Filed: Aug. 22, 2011

(86) PCT No.: PCT/US2011/048618
§ 371 (c)(1),
(2), (4) Date: Feb. 24, 2014

(87) PCT Pub. No.: WO2013/028168
PCT Pub. Date: Feb. 28, 2013

(65) Prior Publication Data
US 2014/0196698 A1 Jul. 17, 2014

(51) Int. Cl.
*F02D 41/30* (2006.01)
*F01N 3/08* (2006.01)
*F02B 47/08* (2006.01)
*F02M 25/07* (2006.01)
*F02D 13/02* (2006.01)
*F02B 29/04* (2006.01)

(52) U.S. Cl.
CPC .............. *F02D 41/30* (2013.01); *F01N 3/0842* (2013.01); *F02B 47/08* (2013.01); *F02D 13/0203* (2013.01); *F02M 25/0707* (2013.01); *F02B 29/0406* (2013.01); *F02M 25/0727* (2013.01); *Y02T 10/121* (2013.01); *Y02T 10/18* (2013.01)

(58) Field of Classification Search
CPC . F02D 41/30; F02D 41/0052; F02D 41/0275; F02D 2200/0406; F02D 2250/34; F02D 2009/0228; F02D 2009/0274; F02D 13/0203; F02M 25/07; F02M 25/0707; F02M 25/0727; F02B 47/08; F02B 29/0406; F01N 3/0842
USPC ............ 123/568.11, 563, 559.1, 339.12, 344, 123/345; 60/600, 605.1, 605.2, 611; 701/101, 102, 103, 108
See application file for complete search history.

(56) References Cited

U.S. PATENT DOCUMENTS

| | | | |
|---|---|---|---|
| 6,729,315 B2 * | 5/2004 | Onodera et al. | 123/568.21 |
| 6,772,742 B2 * | 8/2004 | Lei et al. | 123/568.14 |
| 7,296,562 B2 * | 11/2007 | Withrow et al. | 123/559.1 |
| 7,801,669 B2 * | 9/2010 | Nagae | 701/108 |

* cited by examiner

*Primary Examiner* — Lindsay Low
*Assistant Examiner* — Grant Moubry
(74) *Attorney, Agent, or Firm* — Mark C. Bach; Jeffrey P. Calfa

(57) ABSTRACT

When the difference by which pressure in an engine exhaust manifold exceeds pressure in an engine intake manifold becomes less than a selected difference while an intake valve operating mechanism is closing cylinder intake valves at a selected time in the engine cycle, while an EGR system is conveying the engine exhaust component of an air/exhaust mixture from an exhaust system to an intake system, and a certain quantity of NOx is present in engine exhaust entering the exhaust manifold, the quantity of NOx present in engine exhaust entering the exhaust manifold is reduced below that certain quantity by causing the intake valve operating mechanism to close the cylinder intake valves earlier in the engine cycle than the selected time.

16 Claims, 1 Drawing Sheet

VVA CONTROL OF NOX IN A LOW ΔP AREA OF AN ENGINE OPERATING MAP

TECHNICAL FIELD

This disclosure relates to an internal combustion engine which has a turbocharger (either single- or multiple-stage) and uses external engine exhaust recirculation for controlling certain constituents in engine exhaust, particularly NOx.

BACKGROUND

Supercharging a diesel engine which powers a large commercial vehicle such as a truck or bus can improve engine/vehicle fuel economy and performance. A turbocharger is commonly used for supercharging such an engine. Externally cooled, engine exhaust recirculation (commonly called EGR) is an effective technology for reducing oxides of nitrogen (NOx) in engine exhaust and may be useful in qualifying an engine design for compliance with certain exhaust emission requirements.

The possibility of increasing EGR rates beyond present-day levels can further reduce NOx in engine exhaust. Achieving increased EGR rates depends on the ability to create adequate pressure to drive EGR from an engine exhaust system to an engine intake system at various engine operating conditions.

When an engine is operating in certain areas of an operating map, such as a map of engine speed/engine torque or a map of engine speed/engine horsepower, pressure drop across the engine (i.e., the difference between exhaust manifold pressure and intake manifold pressure, sometimes referred to as ΔP, may not be sufficiently high to drive increased EGR.

If an engine has an intake throttle which is used for various purposes such as reducing air/fuel ratio or increasing exhaust temperature to assist exhaust after-treatment or regenerate a diesel particulate filter, the intake throttle can also be used to drive EGR under certain conditions by throttling intake flow into an intake manifold to increase ΔP. But doing that creates a fuel economy penalty because the engine is forced to work less efficiently.

SUMMARY

Briefly, the engine which is the subject of this disclosure comprises a turbocharger and external engine exhaust recirculation. The engine further comprises variable valve actuation (VVA) which refers to the ability to change the timing of operation of cylinder intake valves and/or cylinder exhaust valves during an engine cycle. In the absence of VVA, cylinder valve timing is fixed by the shape of cams on a camshaft which operate the cylinder valves. There are a variety of mechanisms which can be incorporated in an engine to provide VVA.

Because using an intake throttle to throttle the bulk flow entering an intake manifold at low engine speeds in order to increase ΔP for driving increased EGR penalizes fuel economy, one would expect that using VVA would be no better because it too would penalize fuel economy.

Contrary to that expectation, applicants have discovered that at low engine speeds using VVA can be more effective than using intake throttling by employing a strategy which focuses primarily on the quantity of NOx in engine-out exhaust entering an exhaust manifold from engine cylinders rather than a strategy which focuses on driving increased EGR.

Applicants have recognized that using VVA to control the quantity of NOx in engine-out exhaust, unlike using an intake throttle to throttle bulk flow entering an intake manifold, has no substantial effect on the boost being created in the intake manifold by a turbocharger. Consequently whenever a cylinder intake valve is opened by VVA control, flow into an individual engine cylinder from the intake manifold is driven substantially by the full amount of boost which the turbocharger is providing at the time, and not boost reduced by a pressure drop across the intake throttle when throttling the bulk intake flow.

Controlling cylinder intake valve timing by use of VVA, when compared to use of intake throttling, can more precisely control a number of factors relevant to engine-out NOx such as mass flow, in-cylinder pressure, in-cylinder motion, ignition delay, quality of air-fuel mixing and resulting combustion of the mixture. VVA is believed to provide better management of flow than an intake throttle because unlike an intake throttle which acts on bulk flow to an intake manifold, VVA manages flow into individual engine cylinders. By using VVA control exclusively at low engine speeds and not intake throttle control, additional efficiency losses which are attributable to the use of an intake throttle are avoided.

Control of VVA to vary engine cylinder valve timing is performed by a comprehensive control strategy in an engine controller.

One general aspect of the claimed subject matter relates to the method defined by independent Claim 1.

Another general aspect of the claimed subject matter relates to the engine defined by independent Claim 5.

Another general aspect of the claimed subject matter relates to the engine defined by independent Claim 11.

The foregoing summary is accompanied by further detail of the disclosure presented in the Detailed Description below with reference to the following drawings which are part of the disclosure.

DETAILED DESCRIPTION

Figure 1:
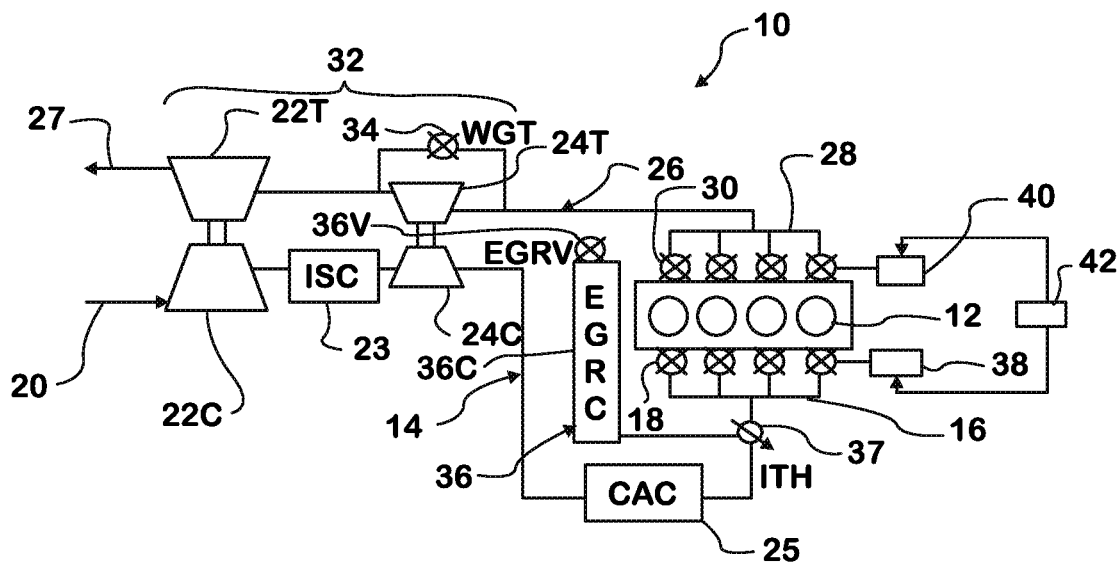
FIG. 1 is a general schematic diagram of an engine which is the subject of this disclosure.

In FIG. 1 an internal combustion engine 10 comprises structure which forms engine cylinders 12 within which fuel combusts with air to operate the engine. Engine 10 further comprises an intake system 14 serving engine cylinders 12 through an intake manifold 16, and cylinder intake valves 18 controlling admission of a fluid mixture which has an air component and an engine exhaust component from intake manifold 16 into engine cylinders 12.

Intake system 14 further comprises an air inlet 20 through which the air component of the mixture enters intake system 14, a compressor 22C in downstream flow relation to air inlet 20 and a compressor 24C in downstream flow relation to compressor 22C. When operating, compressors 22C, 24C cooperate to elevate the pressure of the mixture in intake manifold 16 to superatmospheric pressure, i.e. to develop boost. Some heat of compression of air that has been compressed by compressor 22C is removed by an inter-stage cooler 23 between the two compressors, and some heat of compression of air that has been compressed by compressor 24C is removed by a charge air cooler 25.

Engine 10 further comprises an exhaust system 26 for conveying exhaust created by combustion of fuel in engine cylinders 12 away from engine cylinders 12. Exhaust system 26 comprises an exhaust manifold 28 serving engine cylinders 12. Engine 10 comprises cylinder exhaust valves 30 controlling admission of exhaust from engine cylinders 12 into exhaust manifold 28 for further conveyance through exhaust system 26.

Exhaust system 26 comprises a turbine 24T in downstream flow relationship to exhaust manifold 28 and a turbine 22T in downstream flow relationship to turbine 24T. Turbine 24T is coupled by a shaft to operate compressor 24C so that the two collectively form a high-pressure turbocharger stage. Turbine 22T is coupled by a shaft to operate compressor 22C so that the two collectively form a low-pressure turbocharger stage. An after-treatment system, not shown in FIG. 1, is typically present downstream of turbine 22T for treating exhaust before it passes through a tailpipe 27 to the surrounding atmosphere.

The two turbine-compressor stages form a multi-stage turbocharger 32, which may be either a wastegate type turbocharger or a two-stage variable geometry type turbocharger (VGT). FIG. 1 illustrates a wastegate type turbocharger having a wastegate 34 shunting turbine 24T. If the turbocharger were a single-stage type, turbine 22T, compressor 22C, and inter-stage cooler 23 would not be present. Some two-stage turbochargers other than the one shown in FIG. 1 might include a second wastegate shunting turbine 22T.

Engine 10 further comprises an exhaust gas recirculation (EGR) system 36 which serves to provide the exhaust component of the mixture by conveying a portion of exhaust from exhaust system 26 to intake system 14. FIG. 1 shows EGR system 36 to be a high-pressure type EGR system because the point of EGR diversion from exhaust system 26 is upstream of turbine 24T and the point of introduction into intake system 14 (i.e., the point of mixing of the exhaust component with the air component) is downstream of compressor 24C.

EGR system 36 comprises an EGR valve 36V for selectively restricting exhaust flow from exhaust system 26 to intake system 14, and a heat exchanger (sometimes called an EGR cooler) 36C through which some heat can be rejected from recirculated exhaust to circulating coolant and finally rejected to outside air at a radiator (not shown). Downstream of the mixing point is an intake throttle 37 which can be operated to throttle bulk flow into intake manifold 16.

Engine 10 comprises respective mechanisms 38, 40 for controlling the timing of opening and/or closing of cylinder intake valves 18 and cylinder exhaust valves 30 respectively during engine cycles. One example of a mechanism, sometimes referred to as variable valve actuation (VVA) mechanism, is contained in U.S. application Ser. No. 12/540,828, filed 13 Aug. 2009 and incorporated herein by reference.

Figure 2:
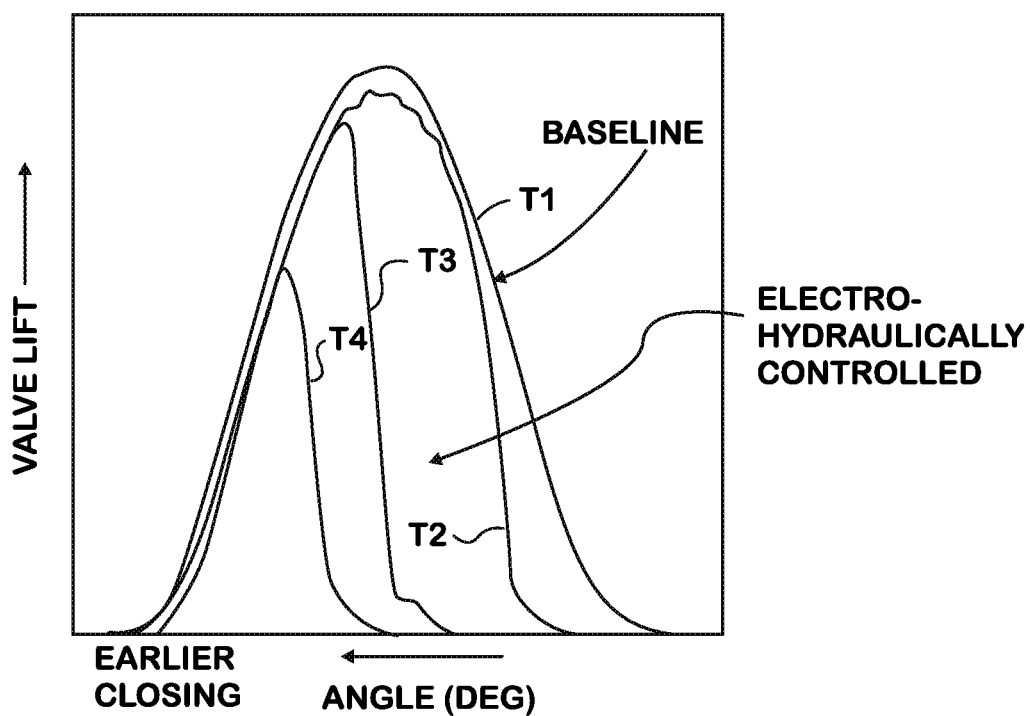
FIG. 2 shows an example of the effect of VVA on cylinder intake valve closing.

FIG. 2 shows an example of how VVA can vary intake cylinder valve timing. Baseline intake valve opening is shown by the valve lift trace T1 with closing occurring at some number of degrees before top dead center (TDC). The baseline timing is set by fixed cams on a camshaft which operate cylinder intake valves 18 when VVA mechanism 38 is not being operated. Traces T2, T3, and T4 show several progressively earlier closing times for cylinder intake valves 18. A VVA mechanism which when operated can provide such a range of cylinder valve closings comprises a hydraulically controlled mechanism which interacts between a cylinder valve and a respective fixed cam on a camshaft. The cams and the VVA mechanism collectively form an intake valve operating mechanism for varying the timing of operation of the cylinder intake valves.

When ΔP becomes less than a selected difference while VVA mechanism 38 is idle so that fixed cams on a camshaft are closing cylinder intake valves 18 at a fixed time in the engine cycle, while EGR system 36 is conveying the engine exhaust component of the mixture from the point of diversion to the point of mixing, and while a certain quantity of NOx is present in engine exhaust entering exhaust manifold 28, the quantity of NOx present in engine exhaust entering exhaust manifold 28 from engine cylinders 12 is then reduced below that certain quantity by operating VVA mechanism 38 to cause cylinder intake valves 18 to close earlier in the engine cycle than the fixed time set by the camshaft cams, i.e. to advance the closing time of cylinder intake valves 18. Intake throttle 37 is not operated and therefore remains in a non-throttling position which doesn't throttle the bulk intake flow entering intake manifold 16.

Cylinder intake valves 18 continue to be closed earlier than the fixed time set by the cams, and intake throttle 37 remains in the non-throttling position until ΔP becomes equal to or greater than the ΔP which initiated earlier closing of cylinder intake valves 18, after which VVA mechanism 38 is again idled so that cylinder intake valves 18 close at the fixed timing set by the cams.

Control of intake cylinder valve timing by VVA mechanism 38 is under the authority of a comprehensive control strategy embodied in an engine controller 42. The control strategy monitors certain variables including engine speed, engine load, and ambient conditions to determine timing of intake valve closing which achieves a targeted quantity of NOx in engine-out exhaust.

A control strategy may impose a limit to which the timing of cylinder intake valve closing can be advanced. If that limit is reached without achieving a targeted quantity of NOx in engine-out exhaust, then the strategy may seek to attain the targeted quantity by invoking use of intake throttle 37 in cooperation with continued use of VVA mechanism 38. Hence, such a strategy for attaining a targeted quantity of NOx in engine-out exhaust is premised upon giving preference to use of VVA mechanism 38 up to a maximum limit of intake valve closing advancement which fails to attain the targeted quantity before intake throttle 37 is used in cooperation with VVA mechanism 38 in an attempt to attain the targeted quantity.

What is claimed is:

1. In an internal combustion engine which comprises,
engine structure comprising engine cylinders within which fuel is combusted to operate the engine,
a turbocharger comprising at least one turbine for operating at least one compressor,
an exhaust system comprising an exhaust manifold through which engine exhaust leaves the engine cylinders and is subsequently conveyed to an exhaust outlet,
the at least one turbine being in downstream flow relation to the exhaust manifold and operated by engine exhaust,
an intake system comprising an air inlet through which an air component for supporting combustion of fuel enters the intake system and an intake manifold through which a mixture comprising the air component and an engine exhaust component diverted from a point of diversion in the exhaust system to a point of mixing in the intake system enters the engine cylinders, the at least one compressor being in downstream flow relationship to the air inlet for causing pressure of the mixture in the intake manifold to be superatmospheric,
cylinder intake valves for controlling admission of the mixture from the intake manifold into the engine cylinders, an EGR system for conveying the engine exhaust component of the mixture from the point of diversion to the point of mixing, and
an intake valve operating mechanism for varying the timing of operation of the cylinder intake valves,
a method comprising:
when the difference by which pressure in the exhaust manifold exceeds pressure in the intake manifold becomes less than a selected difference while the intake valve operating mechanism is closing the cylinder intake valves at a selected time in the engine cycle, while the EGR system is conveying the engine exhaust component of the mixture from the point of diversion to the point of mixing, and while a certain quantity of NOx is present in engine exhaust entering the exhaust manifold from the engine cylinders, thereafter reducing the quantity of NOx present in engine exhaust entering the exhaust manifold below that certain quantity by causing the intake valve operating mechanism to close the cylinder intake valves earlier in the engine cycle than the selected time.

2. The internal combustion engine set forth in claim 1, further comprising an intake throttle operable from a non-throttling position to selectively throttle flow entering the intake manifold, wherein the method further comprises causing the intake throttle to assume the non-throttling position while the intake valve operating mechanism is closing the cylinder intake valves earlier in the engine cycle than the selected time.

3. The internal combustion engine set forth in claim 2, wherein the method further comprises continuing to cause the intake valve operating mechanism to close the cylinder intake valves earlier than the selected time in the engine cycle and to cause the intake throttle to assume the non-throttling position until the difference by which pressure in the exhaust manifold exceeds pressure in the intake manifold becomes equal to or greater than the selected difference, and then causing the intake valve operating mechanism to close the cylinder intake valves no earlier than the selected time.

4. The internal combustion engine set forth in claim 2, wherein the method further comprises operating the intake throttle from the non-throttling position to begin throttling flow entering the intake manifold when the intake valve operating mechanism is closing the cylinder intake valves at a maximum limit of advancement in the engine cycle which has failed to attain a targeted quantity of NOx in engine exhaust entering the exhaust manifold.

5. An internal combustion engine which comprises,
engine structure comprising engine cylinders within which fuel is combusted to operate the engine,
a turbocharger comprising at least one turbine for operating at least one compressor,
an exhaust system comprising an exhaust manifold through which engine exhaust leaves the engine cylinders and is subsequently conveyed to an exhaust outlet, the at least one turbine being in downstream flow relation to the exhaust manifold and operated by engine exhaust,
an intake system comprising an air inlet through which an air component for supporting combustion of fuel enters the intake system and an intake manifold through which a mixture comprising the air component and an engine exhaust component diverted from a point of diversion in the exhaust system to a point of mixing in the intake system enters the engine cylinders, the at least one compressor being in downstream flow relationship to the air inlet for causing pressure of the mixture in the intake manifold to be superatmospheric,
cylinder intake valves for controlling admission of the mixture from the intake manifold into the engine cylinders,
an EGR system for conveying the engine exhaust component of the mixture from the point of diversion to the point of mixing,
an intake valve operating mechanism for varying the timing of operation of the cylinder intake valves during engine cycles, and
a controller which, when the difference by which pressure in the exhaust manifold exceeds pressure in the intake manifold becomes less than a selected difference while the intake valve operating mechanism is closing the cylinder intake valves at a selected time in the engine cycle, while the EGR system is conveying the engine exhaust component of the mixture from the point of diversion to the point of mixing, and while a certain quantity of NOx is present in engine exhaust entering the exhaust manifold from the engine cylinders, then reduces the quantity of NOx present in engine exhaust entering the exhaust manifold below that certain quantity by causing the intake valve operating mechanism to close the cylinder intake valves earlier in the engine cycle than the selected time.

6. The engine set forth in claim 5 in which the engine further comprises an intake throttle operable from a non-throttling position to selectively throttle flow entering the intake manifold, and the controller causes the intake throttle to assume the non-throttling position while causing the intake valve operating mechanism to close the cylinder intake valves earlier in the engine cycle than the selected time.

7. The engine set forth in claim 6 in which the controller continues to cause the intake valve operating mechanism to close the cylinder intake valves earlier than the selected time in the engine cycle and to cause the intake throttle to assume the non-throttling position until the difference by which pressure in the exhaust manifold exceeds pressure in the intake manifold becomes equal to or greater than the selected difference, and then the controller causes the intake valve operating mechanism to close the cylinder intake valves no earlier than the selected time.

8. The engine set forth in claim 5 in which the point of diversion is upstream of the at least one turbine and downstream of the exhaust manifold and the point of mixing is downstream of the at least one compressor and upstream of the intake manifold.

9. The engine set forth in claim 8 in which the EGR system comprises an EGR valve and an EGR cooler for cooling engine exhaust passing through the EGR system.

10. The engine set forth in claim 6 in which the controller causes the intake throttle to be operated from the non-throttling position to begin throttling flow entering the intake manifold when the intake valve operating mechanism is closing the cylinder intake valves at a maximum limit of advancement in the engine cycle which has failed to attain a targeted quantity of NOx in engine exhaust entering the exhaust manifold.

11. An internal combustion engine which comprises,
engine structure comprising engine cylinders within which fuel is combusted to operate the engine,
a turbocharger comprising at least one turbine for operating at least one compressor,
an exhaust system comprising an exhaust manifold through which engine exhaust leaves the engine cylinders and is subsequently conveyed to an exhaust outlet,
the at least one turbine being in downstream flow relation to the exhaust manifold and operated by engine exhaust, an intake system comprising an air inlet through which an air component for supporting combustion of fuel enters the intake system and an intake manifold through which a mixture comprising the air component and an engine exhaust component diverted from a point of diversion in the exhaust system to a point of mixing in the intake system enters the engine cylinders, the at least one compressor being in downstream flow relationship to the air inlet for causing pressure of the mixture in the intake manifold to be superatmospheric, cylinder intake valves for controlling admission of the mixture from the intake manifold into the engine cylinders, a camshaft having fixed cams set to open and close the cylinder intake valves at fixed times during an engine cycle;

an EGR system for conveying the engine exhaust component of the mixture from the point of diversion to the point of mixing, a variable valve actuating mechanism which interacts with the fixed cams and the cylinder intake valves for advancing the closing time of the cylinder intake valves from the fixed closing time set by the fixed cams, and a controller which, when the difference by which pressure in the exhaust manifold exceeds pressure in the intake manifold becomes less than a selected difference while the variable valve actuating mechanism is idle and the cylinder intake valves close at the closing time set by the fixed cams, while the EGR system is conveying the engine exhaust component of the mixture from the point of diversion to the point of mixing, and while a certain quantity of NOx is present in engine exhaust entering the exhaust manifold from the engine cylinders, then reduces the quantity of NOx present in engine exhaust entering the exhaust manifold below that certain quantity by operating the variable valve actuating mechanism to cause the closing time of the cylinder intake valves to be advanced from the fixed closing time set by the fixed cams.

12. The engine set forth in claim 11 in which the engine further comprises an intake throttle operable from a non-throttling position to selectively throttle flow entering the intake manifold, and the controller causes the intake throttle to assume the non-throttling position while operating the variable valve actuating mechanism to cause the closing time of the cylinder intake valves to be advanced from the fixed closing time set by the fixed cams.

13. The engine set forth in claim 12 in which the controller continues to cause the variable valve actuating mechanism to cause the closing time of the cylinder intake valves to be advanced from the fixed closing time set by the fixed cams and to cause the intake throttle to assume the non-throttling position until the difference by which pressure in the exhaust manifold exceeds pressure in the intake manifold becomes equal to or greater than the selected difference, and then the controller causes the variable valve actuating mechanism to become idle so that the cylinder intake valves to be closed at the fixed closing time set by the fixed cams.

14. The engine set forth in claim 11 in which the point of diversion is upstream of the at least one turbine and downstream of the exhaust manifold and the point of mixing is downstream of the at least one compressor and upstream of the intake manifold.

15. The engine set forth in claim 14 in which the EGR system comprises an EGR valve and an EGR cooler for cooling engine exhaust passing through the EGR system.

16. The engine set forth in claim 12 in which the controller causes the intake throttle to be operated from the non-throttling position to begin throttling flow entering the intake manifold when the intake valve operating mechanism is closing the cylinder intake valves at a maximum limit of advancement in the engine cycle which has failed to attain a targeted quantity of NOx in engine exhaust entering the exhaust manifold.

* * * * *